(12) United States Patent
Marupaduga et al.

(10) Patent No.: US 9,014,309 B1
(45) Date of Patent: Apr. 21, 2015

(54) ADAPTIVE PER-ANTENNA RATE CONTROL BASED ON NETWORK CONDITIONS

(71) Applicant: Sprint Spectrum L.P., Overland Park, KS (US)

(72) Inventors: Sreekar Marupaduga, Overland Park, KS (US); Patrick Schmidt, Bonner Springs, KS (US); Andy Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/083,760

(22) Filed: Nov. 19, 2013

(51) Int. Cl.
*H03D 1/00* (2006.01)
*H04L 27/06* (2006.01)
*H04L 1/20* (2006.01)

(52) U.S. Cl.
CPC ...................................... *H04L 1/208* (2013.01)

(58) Field of Classification Search
CPC .. H04B 7/0669; H04L 1/005; H04L 2001/12; H04L 1/20; H04L 1/208; H04L 25/0206; H04L 1/0036; H04L 1/0631
USPC .................. 375/224, 227, 225, 340, 346, 349
See application file for complete search history.

(56) References Cited

U.S. PATENT DOCUMENTS

| | | | |
|---|---|---|---|
| 7,649,954 B2 * | 1/2010 | Walton et al. ................. | 375/267 |
| 8,693,561 B2 * | 4/2014 | Raju et al. ..................... | 375/260 |
| 2008/0151804 A1 * | 6/2008 | Wang et al. ................... | 370/312 |
| 2009/0044065 A1 * | 2/2009 | She et al. ...................... | 714/748 |
| 2012/0198315 A1 * | 8/2012 | Soliman et al. ............... | 714/786 |
| 2013/0308727 A1 * | 11/2013 | Guo ............................... | 375/299 |
| 2014/0064390 A1 * | 3/2014 | Uln et al. ...................... | 375/267 |

* cited by examiner

*Primary Examiner* — Jean B Corrielus (57) ABSTRACT

Methods and systems are provided for enabling adaptive per-antenna rate control based on network conditions for a wireless communication device (WCD). The WCD and a radio access network (RAN) may form a communication link that has multiple data streams, each data stream received by a different antenna of the WCD. Each data stream may have a different encoding, and thus a different data rate. Additionally, each encoding may have an associated signal-to-interference-plus-noise ratio (SINR) requirement to decode. The more complicated an encoding, the higher the data rate the encoding supports. However, more complicated encodings also need a higher SINR to decode. By first decoding a data stream with a low-complexity encoding, the data can be subtracted from a data stream having a more complicated encoding. Therefore, the SINR of the data stream having a more complicated encoding may be increased, and increase the likelihood of it being decodable.

20 Claims, 5 Drawing Sheets

ADAPTIVE PER-ANTENNA RATE CONTROL BASED ON NETWORK CONDITIONS

BACKGROUND

To provide cellular wireless communication service, a wireless service provider or "wireless carrier" typically operates a radio access network (RAN) that defines one or more coverage areas in which wireless communication devices (WCDs) can be served by the RAN and can thereby obtain connectivity to broader networks such as the public switched telephone network (PSTN) and the Internet. A typical RAN may include one or more base stations (e.g., base transceiver stations, eNodeBs, access nodes, access points, etc.), each of which may radiate to define a cell and cell sectors in which WCDs can operate. Further, the RAN may include supplementary network infrastructure (e.g., controllers, mobility management entities, etc.), which may be integrated with or otherwise in communication with the various base stations. The supplementary network infrastructure may include, or be in communication with, a switch or gateway that provides connectivity with one or more transport networks. With this or other arrangements, a cell phone, personal digital assistant, wirelessly equipped computer, or any other WCD that is positioned within coverage of the RAN can then communicate with a base station and in turn, via the base station, with other served devices or with other entities on the transport network.

OVERVIEW

During a communication session, a RAN and a WCD form a communication link with a radio signal made up of encoded data. The communication link includes (i) a downlink where the RAN sends data to the WCD and (ii) an uplink where the WCD sends data to the RAN. On the downlink, the RAN may send data on communication link as multiple data streams.

In one example, a RAN and a WCD may form a communication link with multiple data streams. Each data stream of the communication link communicates data to the WCD where it is received with its own antenna of the WCD, independent of each other data stream. Additionally, each data stream may include a different data encoding than the other respective data streams.

When receiving data transmitted by the RAN over the communication link, the WCD will decode the data it receives. The RAN may vary the encoding of the data streams based on radio conditions of the communication link. More complicated encodings may enable the RAN to communicate data to the WCD with a higher data rate. However, the more complicated encodings may be more susceptible to noise on the communication link. Each encoding has an associated signal-to-interference-plus-noise ratio (SINR) requirement to enable the WCD to decode each encoded data stream. If the SINR of a received data stream is below the requirement, the WCD may not be able to decode the data stream.

Noise and interference on the communication link may take various forms. For example, noise and interference may be both radio signals intended for other devices and radio signals other than the desired data stream. Because the RAN may transmit multiple data streams to the WCD at the same time, each data stream other than the particular one being decoded may contribute to the noise and interference when decoding the particular data stream. Therefore, as a RAN communicates more data streams to a WCD over a communication link, the noise and interference measured as any one of the data streams is decoded may increase.

In some instances a WCD may receive multiple data streams over a communication link while operating in an environment with a significant amount of radio noise. Each data stream may have its data encoded based on a different complexity encoding than the other data streams. Based on the noise causing a poor SINR, the WCD may only be able to decode data from the data streams with the least complex encodings. However, rather than discarding data from data streams that cannot be decoded, the WCD may store the un-decodable data stream in a memory of the WCD. Once the WCD has decoded data from the data stream with the less complex encoding, the WCD may subtract the data stream signal that contained the decoded data from the un-decodable data stream stored in the memory.

By subtracting the data stream signal that contained the decoded data from a different data stream, the noise associated with the un-decodable data stream can be reduced by removing components of the noise that are cause by the data stream containing the decoded data. After subtracting a decodable data stream from the un-decodable data stream has reduced the noise, the SINR associated with the un-decodable data stream may be high enough for the WCD to decode the data. Thus, the WCD may use information from one data stream to lower the noise on a different data stream. The lowering of the noise may allow the previously un-decodable data stream to be decoded by the WCD.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the claims.

BRIEF DESCRIPTION OF THE DRAWINGS

Various embodiments are described herein with reference to the following drawings, wherein like numerals denote like entities.

DETAILED DESCRIPTION

1. Example Communication System Architecture

Figure 1:
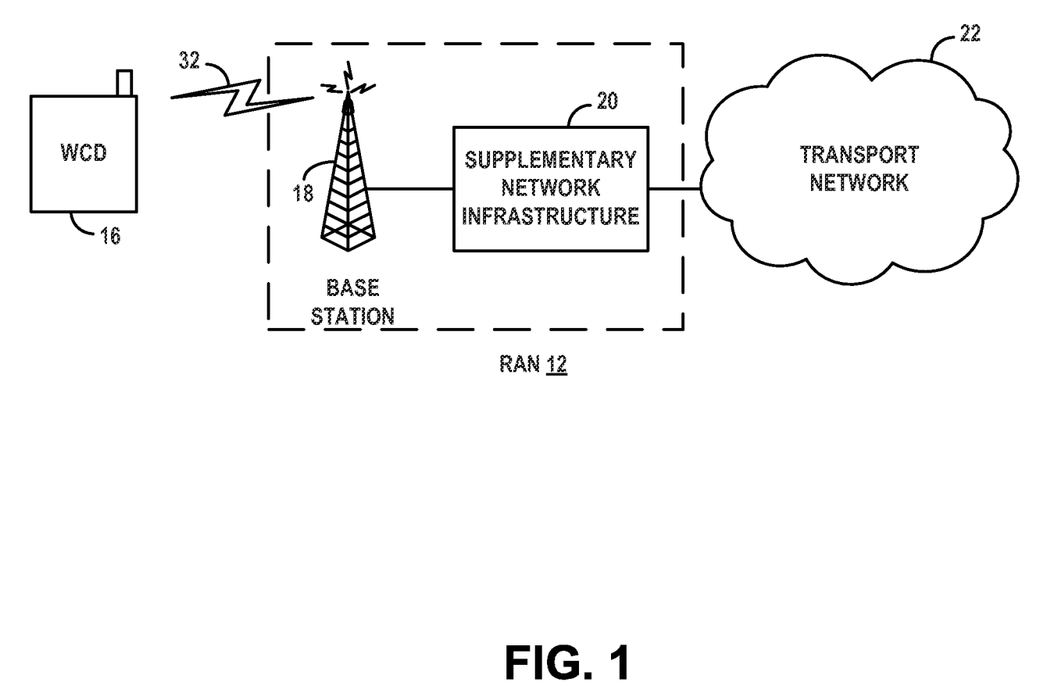
FIG. 1 depicts an example communication system.

Referring to the drawings, FIG. 1 is a simplified block diagram of a network in which at least one embodiment of this disclosure can be implemented. By way of example, the figure depicts a RAN 12 arranged to serve at least one wireless communication device (WCD) such as a representative WCD 16. These representative system arrangements are of course merely examples, and those skilled in the art will understand that numerous variations are possible, ranging from a simple wireless access point router or other such serving device to a far more complex system. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, a processor that executes program instructions stored in memory or another machine-readable medium may carry out various functions.

The RAN 12 is shown including a base station (BS) 18 and supplementary network infrastructure 20 that provides connectivity with a transport network 22 such as the public switched telephone network (PSTN) and/or the Internet. In the disclosed representative system, the BS includes one or more antennas or antenna arrangements that radiate to define one or more air-interface coverage areas, such as cells or cell sectors, in which WCDs can communicate with the BS. The BS may be able to adjust a beam width, a tilt, and other parameters of the antennas that transmit signals. FIG. 1 conceptually depicts a representative coverage area 32 provided by RAN 12.

In some examples, the BS may be able to focus transmitted energy to specific parts of the coverage area, such as a location of a WCD. In some embodiments, the BS may be able to adjust a Remote Electrical Tilt (RET), Remote Azimuth Steering (RAS) and Remote Azimuth Beam-width (RAB). By using a combination of RET, RAS, and RAB, a BS may be able to increase or decrease the signal strength received by a WCD. Because when the BS adjusts at least one of RET, RAS, and RAB the strength of the signal received by the WCD may change, a signal-to-interference-plus-noise ratio (SINR) of the signal received by a WCD may change. In some embodiments, a WCD may communicate information about signals it receives from the BS back to the BS. In response, the BS may vary some transmission properties, such as RET, RAS, and RAB in order to increase the likely the WCD may be able to decode a received signal.

The supplementary network infrastructure may be connected with, and control, one or more BSs and may manage various aspects of air-interface operation, such as handoffs between BSs or the like. Further, in some systems, a radio network controller or other such component provides similar functionality.

The supplementary network infrastructure may include a switch/gateway that may be connected with one or more controller components. The controller components may manage functions such as handoffs between various coverage areas. Further, the switch/gateway may provide connectivity with a transport network. For instance, a switch such as a switching center or gateway may provide connectivity with the PSTN, and a gateway may provide connectivity with a packet-switched network such as the Internet.

Communications in a given coverage area between a representative BS and WCDs such as WCD 16 may define a "forward link" in the direction from the BS to the WCD and a "reverse link" in the direction from the WCD to the BS. The BS and WCD may each be programmed or otherwise equipped to engage in such communications in accordance with an agreed air-interface protocol, examples of which include LTE, CDMA (e.g., 1xRTT or 1xEV-DO), AMPS, AMPA, GPRS, MMDS, UMTS, EDGE, WiMAX (e.g., IEEE 802.16), iDEN, LTE, GSM, TDMA, microwave, satellite, Wi-Fi (e.g., IEEE 802.11), Bluetooth, and others now known or later developed. A given air interface may define a number of discrete communication channels through a time-division multiplexing, code-division multiplexing, frequency-division multiplexing, and/or another mechanism now known or later developed.

On the forward link in each coverage area, a typical air interface protocol may define a pilot signal that WCDs can detect as an indication of the presence of the coverage area and that WCDs can measure as a basis to determine the quality and sufficiency of available coverage. Each pilot signal may include or embody (e.g., be based on) an identifier of the coverage area, so that when a WCD detects the pilot signal, the WCD can associate the pilot signal with a particular coverage area. Further, the forward link may also define other air-interface channels, such as broadcast control channels that provide data defining operational parameters for the coverage area, paging channels through which the BS can direct control messages to particular WCDs, and traffic channels through which the BS can transmit bearer traffic (e.g., voice data, audio data, or other data) to served WCDs. Additionally, the forward link may include multiple signals simultaneously communicated from the BS to the WCD. The WCD may contain multiple antennas, with each antenna receiving one of the signals simultaneously communicated from the BS to the WCD.

The reverse link in each coverage area may then likewise define various channels, such as access channels through which WCDs can transmit to the BS access probes that define origination requests, registration requests or the like, and traffic channels through which WCDs can transmit bearer traffic to the BS.

2. Example Network Device

Figure 2:
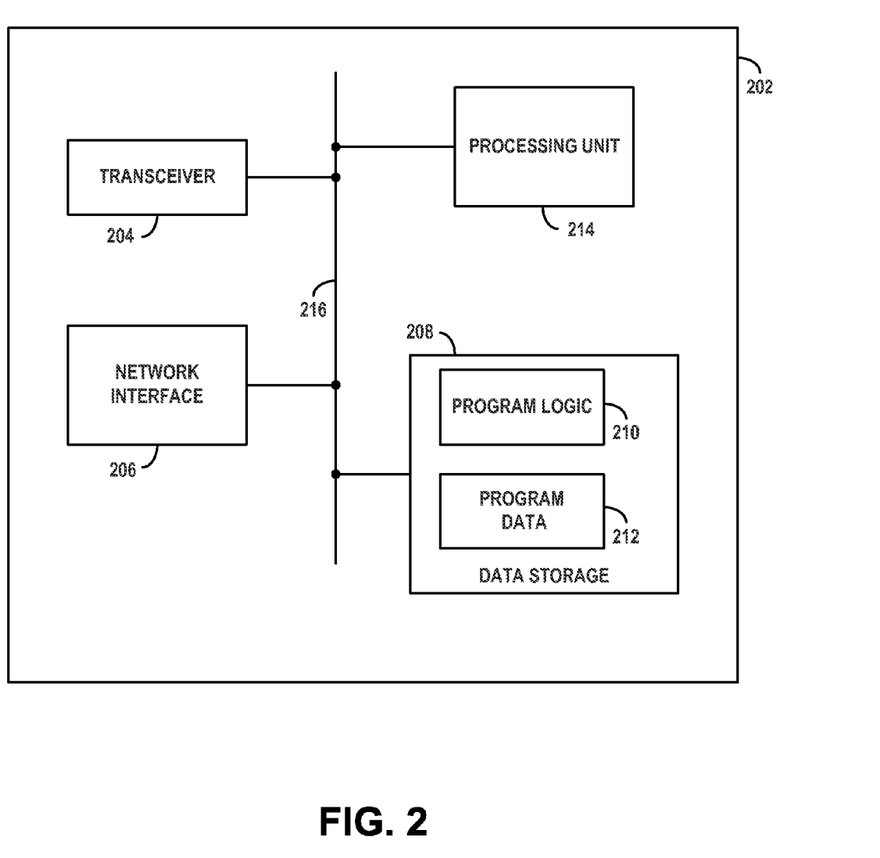
FIG. 2 depicts an example network device.

FIG. 2 is a simplified block diagram depicting functional components of an example network device 202 arranged to carry out some of the functions described herein. The example network device 202 may be representative of BS 18, supplementary network infrastructure 20, supplementary network infrastructure 20 integrated with BS 18, or some other entity associated with transport network 22 in FIG. 1, for instance. As shown in FIG. 2, network device 202 includes a transceiver 204, network interface 206, a processing unit 214, and data storage 208, all of which may be coupled together by a system bus 216 or other mechanism. In addition, the network device may also include external storage, such as magnetic or optical disk storage, although this is not shown in FIG. 2.

These components may be arranged to support conventional operation of BS 18 and supplementary network infrastructure 20 in an LTE-compliant wireless-communication network, such as network 12 illustrated in FIG. 1. The details of such an arrangement and how these components function to provide conventional operation are well-known in the art and are not described further herein. Certain aspects of network device 202 relevant to the functions discussed herein are discussed briefly below.

Network interface 206 in combination with transceiver 204, which may include one or more antennas, enables communication on a network, such RAN 12. Accordingly, network interface 206 may take the form of trunk or optical link that can be coupled with a switch/gateway of supplementary network infrastructure 20, or any Ethernet network interface card or other physical connection that can be coupled with any other entity on the RAN 12 or transport network 22, for instance. Further, network interface 206 in combination with transceiver 204 enables air-interface communication with one or more WCDs, supporting forward-link transmissions of protocol version messages, among other message and commands, and supporting reception reverse-link traffic on reverse links. The interface 206 may also include a module, such as a chipset that may support wireless packet-data communications according to an LTE family of protocols.

Processing unit 214 comprises one or more general-purpose processors and/or one or more special-purpose processors (e.g., dedicated digital signal processor, application-specific integrated circuit, etc.). In turn, the data storage 208 comprises one or more volatile and/or non-volatile storage components, such as magnetic or optical memory or disk storage. Data storage 208 can be integrated in whole or in part with processing unit 214, as cache memory or registers for instance. As further shown, data storage 208 is equipped to hold program logic 210 and program data 212. Program logic 210 may comprise machine-language instructions that define routines executable by processing unit 214 to carry out various functions described herein. The memory may take the form of a non-transitory computer readable media with stored instructions. The instructions could be executable by a computing device, such as processing unit 214, to cause the computing device to perform functions similar to those described in the aforementioned methods.

Those skilled in the art will appreciate that there can be numerous specific implementations of a network device (e.g., a BS, MSC, eNodeB, other switch or gateway, or other entity associated with a transport network) that could be used in connection with at least one embodiment.

3. Example WCD

Figure 3:
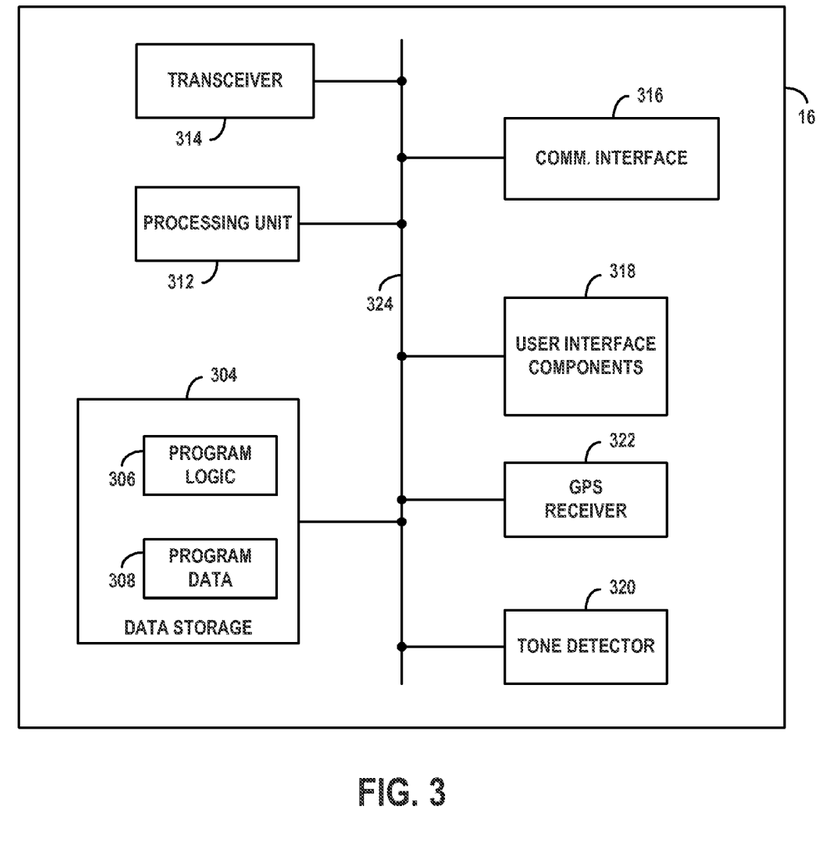
FIG. 3 depicts an example wireless communication device (WCD)

FIG. 3 is a simplified block diagram depicting functional components of an example WCD 16 that may be arranged to carry out at least one embodiment. The example WCD 16 could be or include a cell phone, a personal digital assistant (PDA), a pager, a wirelessly-equipped notebook computer, and/or any other sort of device. As shown in FIG. 3, the example WCD 16 includes data storage 304, processing unit 312, transceiver 314, communication interface 316, user-interface components 318, tone detector 320, and GPS receiver 322, all of which may be coupled together by a system bus 324 or other mechanism.

These components may be arranged to support operation of the WCD 16 in an LTE-compliant wireless-communication network, such as RAN 12 illustrated in FIG. 1. The details of such an arrangement are well known in the art and are not described further herein. Certain aspects of WCD 16 may be relevant to at least one embodiment as described herein and are discussed briefly below.

Although FIG. 3 portrays communication interface 316 and transceiver 314 as separate components, in some embodiments a single chipset may integrate both communication interface 316 and transceiver 314. Communication interface 316 in combination with transceiver 314, which may include one or more antennas, may enable communication with a network. Such communication may include the reception of data or voice communication from the serving base station and transmission of data or voice to the serving base station. The communication interface may include a module that supports wireless packet-data communications according to an LTE family of protocols, among many options. The transceiver 314 includes both a transmitter and a receiver for the WCD 16. Additionally, the transceiver 314 may include an antenna configured to send signals created by the transmitter and receive signals from a BS of a RAN. The communication interface 316 may include a baseband processor configured to control the transceiver 314. The baseband processor may function to encode and decode the communication signals that are sent and received. The baseband processor may perform the encoding and decoding based on one or more codecs.

Processing unit 312 comprises one or more general-purpose processors and/or one or more special-purpose processors (e.g., dedicated digital signal processor, application specific integrated circuit, etc.). In turn, the data storage 304 comprises one or more volatile and/or non-volatile storage components, such as magnetic or optical memory or disk storage. Data storage 304 can be integrated in whole or in part with processing unit 312, as cache memory or registers for instance. In example WCD 16, as shown, data storage 304 is configured to hold both program logic 306 and program data 308. Program logic 306 and/or program data 308 may comprise machine-language instructions that define routines executable by processing unit 312 to carry out at least one embodiment as described herein. The memory may take the form of a non-transitory computer readable media with stored instructions. The instructions could be executable by a computing device, such as processing unit 214, to cause the computing device to perform functions similar to those described in the aforementioned methods.

In at least one embodiment, processing unit 312 is embedded with a wireless chipset, and thus may be part of communication interface 316.

GPS receiver 322 may be any known or hereafter-developed GPS receiver, suitable for receiving and decoding GPS signals for location and timing purposes, perhaps among other purposes; in some embodiments, WCD 16 does not have a location module such as GPS receiver 322, or has location-determination technology that takes another form.

It will be appreciated that there can be numerous specific implementations of a WCD, such as WCD 16, that may be arranged to carry out at least one embodiment as described herein. Further, given this disclosure, one of skill in the art would understand how to devise and build such an implementation.

4. Example Adaptive Per-Antenna Rate Control

Figure 4:
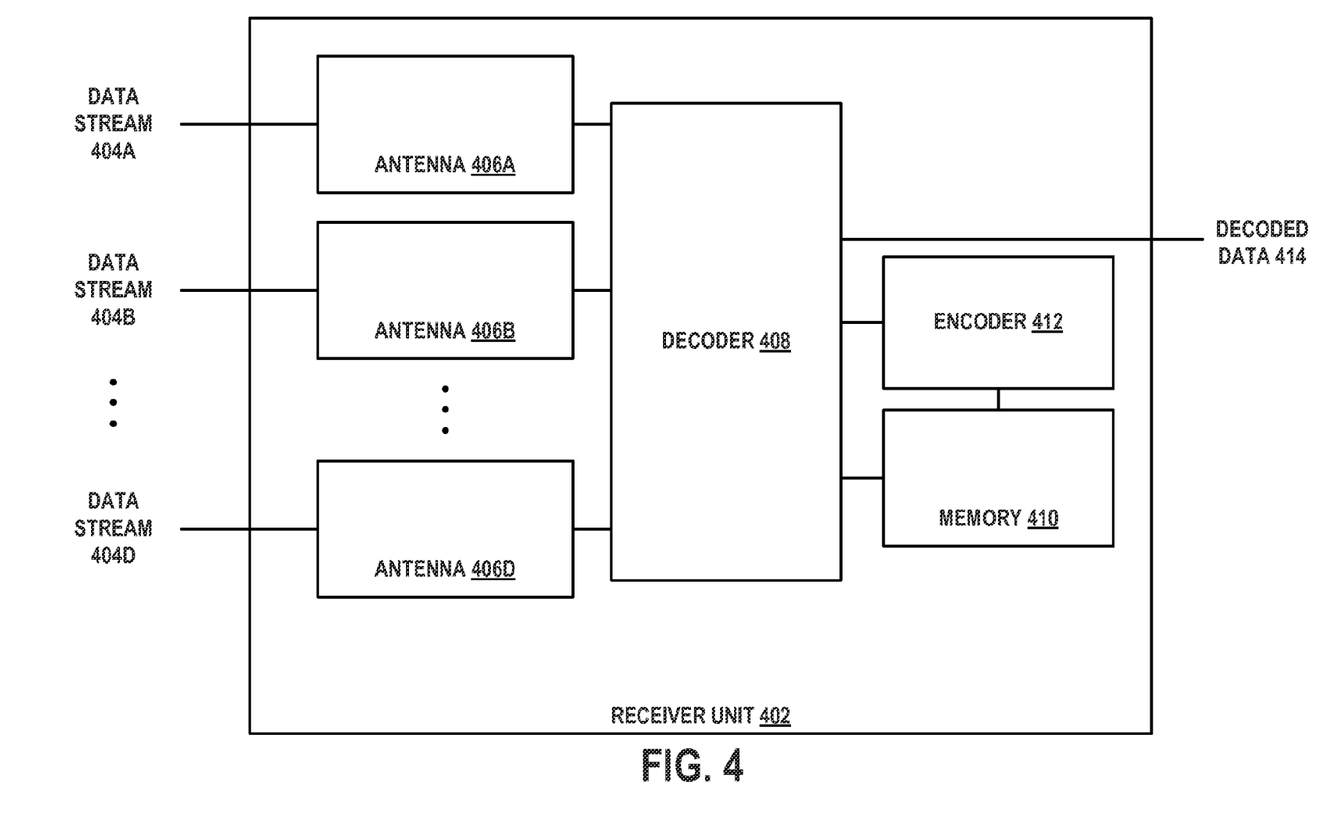
FIG. 4 is a conceptual illustration of an example receiver unit within a WCD.

FIG. 4 is a conceptual illustration of a receiver unit 402 of a WCD. The receiver unit 402 is shown as a single unit in FIG. 4, but may take many other forms. For example, functional portions of the receiver unit 402 may be performed by various components of FIG. 3. As shown in FIG. 4, the receiver unit 402 may received a plurality of data streams 404A-404D with a plurality of antennas 406A-406D. Each antenna may be configured to receive one data stream and couple the received data stream to a decoder 408. As shown in FIG. 4, there is one decoder 408 in the receiver unit 402. However, in other embodiments, there may be more than one decoder 408, such as one decoder for each respective antenna. The decoder 408 may be configured to output decoded data 414. Additionally, the receiver unit 402 includes a memory 410. The memory may be configured to store at least one of the data streams 404A-404D that cannot be decoded by decoder 408. As shown in FIG. 4, the memory is coupled to the decoder 408. However, in other embodiments, the memory 410 may be coupled to a different component, such as each antenna 406A-406D.

During some communication sessions, when the WCD receives data transmitted by the RAN, the WCD will receive multiple data streams at the same time. Each data stream may contain data that is independent of each other data stream. By receiving several streams at one time, the overall rate at which the RAN can communicate data to a WCD can be increased. The receiver unit 402 may be configured to decode multiple data streams.

Because the RAN may transmit multiple data streams to the WCD at the same time, each antenna 406A-406D of the receiver unit may receive both the data stream 404A-404D intended for the respective antenna and a portion of the data streams that are intended for a different antenna. Therefore, each data stream, other than the particular one being decoded by the decoder 408, may contribute to the noise when the decoder 408 is decoding a particular data stream. As the RAN communicates more data streams 404A-404D to a WCD over a communication link, the noise measured as any one of the data streams is decoded may increase.

As previously discussed, in various embodiments the RAN may vary the encoding of each respective data streams based on radio conditions of the communication link. Therefore, the decoder 408 may be able to decode each of the possible encoding the RAN may use to communicate data. More complicated encodings may enable the RAN to send data to the WCD with a higher data rate. However, the more complicated encodings may be more susceptible to noise on the communication link, and thus are harder for the decoder 408 of the WCD to decode.

Each encoding has an associated signal-to-interference-plus-noise ratio (SINR) requirement to enable the WCD to decode the encoded data stream. If the SINR for a data stream is below the SINR requirement for the data stream's encoding, the WCD may not be able to decode the data stream. The SINR is a measurement of the ratio of the desired signal from the respective data stream 404A-404D to all interference and noise received by the respective antenna 406A-406D associated with the respective data stream 404A-404D. Interference and noise generally has two components. The first component is ambient radio noise present in an environment. The second component is interference caused by undesired radio transmissions, including the data streams 404A-404D other than the respective data stream 404A-404D to decode.

When the WCD receives multiple data streams over a communication link with the receiver unit 402, the decoder 408 attempts to decode data. However, if the SINR of a data stream 404A-404D is below the SINR threshold for the encoding of the data stream, the decoder 408 may not be able to decode the data stream. Based on the noise and interference causing a poor SINR, the decoder 408 of the WCD may only be able to decode data from the data streams with the least complex encodings (e.g., having the lowest SINR threshold). However, rather than discarding data from data streams 404A-404D that cannot be decoded, the decoder 408 may cause the un-decodable data stream(s) to be stored in the memory 410 of the receiver unit 402. In some embodiments, the memory 410 may be configured to store each received data stream 404A-404D as it is received from the RAN. The memory 410 may be considered a data cache that the decoder 408 can use to pull data from to decode.

In some embodiments, once the decoder 408 has decoded data from at least one data stream 404A-404D, typically a data stream 404A-404D with a less complex encoding, the decoder 408 may store the decoded data in the memory 410. The decoded data may be re-encoded with the encoder 412, based on the same encoding that was used to transmit the respective data stream 404A-404D from the RAN to the WCD, and stored in the memory 410 as a re-encoded data stream. The re-encoded data stream forms a version of the respective data stream 404A-404D that has all noise components removed. Therefore, the re-encoded data stream is a clean version of the respective data stream 404A-404D.

Once a re-encoded data stream is created, the decoder 408 may retrieve an un-decodable data stream and at least one re-encoded data stream from the memory 410. The decoder 408 may subtract the at least one re-encoded data stream from the un-decodable data stream to form an adjusted data stream. The adjusted data stream should have an increased SINR compared to the un-decodable data stream as it was received as data stream 404A-404D. The SINR increases due to the data stream that was decoded forming a portion of the interference of the received data stream 404A-404D that was un-decodable.

After subtracting at least one re-encoded data stream from the un-decodable data, the SINR associated with the un-decodable data stream may be high enough for the decoder 408 to decode the data. Thus, the decoder 408 may use information from one decoded data stream to lower the noise and interference on a different data stream that has been stored in a memory. The lowering of the noise may allow the previously un-decodable data stream to be decoded by the decoder 408 and output as decoded data 414.

In some embodiments, the decoder 408 may continue to attempt to decoded stored un-decodable data streams iteratively after each successful decoding of a data stream. In still other embodiments, the decoder 408 attempts to decode data after ranking each data stream in terms of the associated SINR threshold. The data streams with the lowest requirement (e.g., the easiest to decode data) are decoded first. Once all the data streams that have a SINR greater than the SINR threshold are decoded, the above-mentioned subtraction process may be performed. In further embodiments, the WCD may send a communication to the RAN if any data streams cannot be decoded (either before or after the subtraction process was performed). The RAN may responsively adjust the encoding associated with the un-decodable data stream to have a lower SINR threshold. Therefore, the RAN may adapt the encoding (and thus data rate) based on not being able to decode at least one data stream.

5. Example Operation

Figure 5:
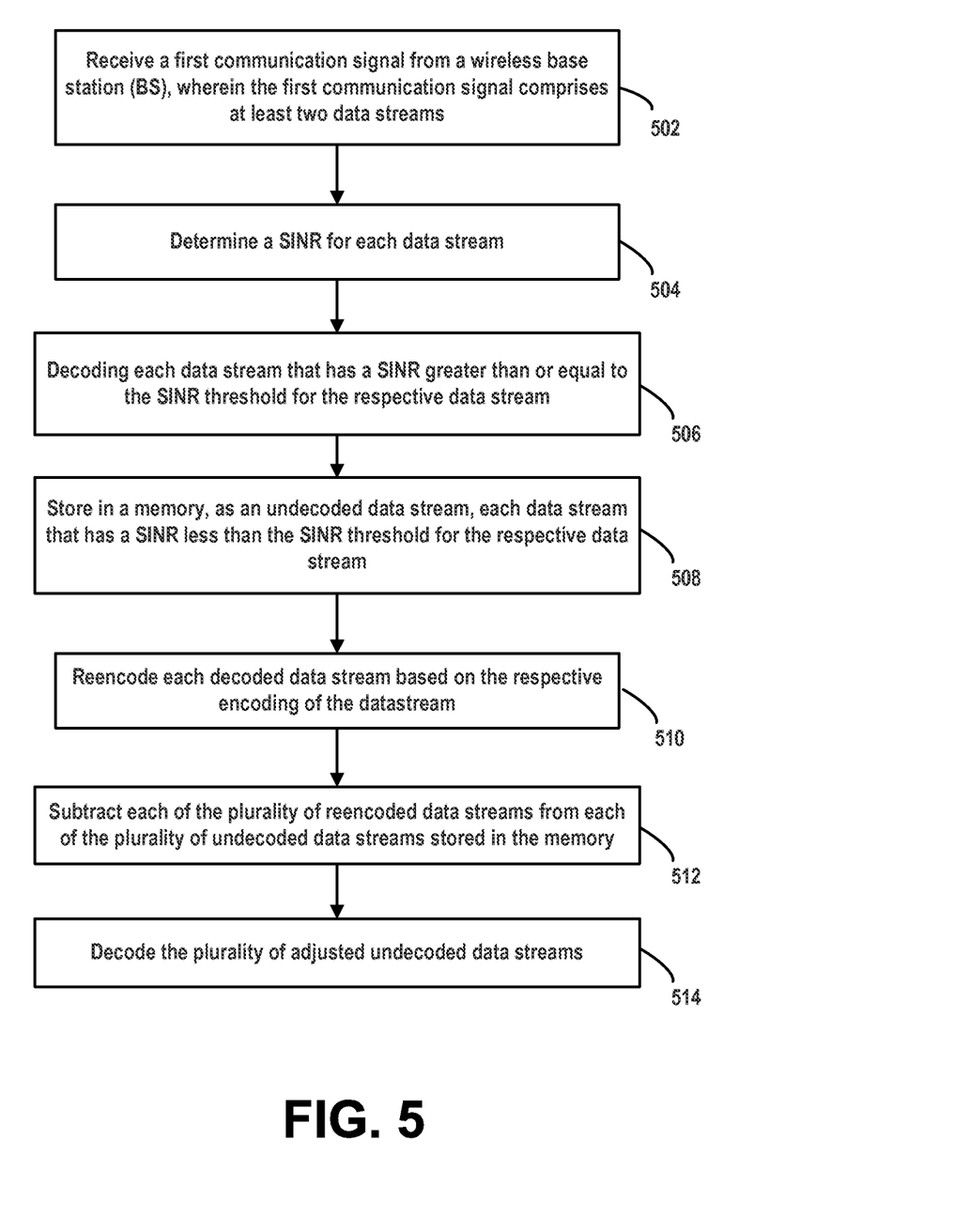
FIG. 5 is a flowchart of an example method for decoding multiple data streams with a WCD.

FIG. 5 is a flow chart depicting functions that can be carried out by a WCD in accordance with at least one embodiment. FIG. 5 presents one example of the methods that are disclosed herein. In various embodiments, some steps may be omitted, performed in a different order, and/or performed in parallel. The method of FIG. 5 may be performed while the WCD transmits and receives information during an ongoing communication session. Alternatively, the method of FIG. 5 may be performed while the WCD operates in an idle mode and it not currently transmitting or receiving data, but has some received data stored in a memory.

As shown in FIG. 5, the flowchart begins at block 502, where the RAN and the WCD communicate with a first communication signal. The WCD receives a first communication signal from a wireless base station (BS). The first communication signal includes at least two data streams. Each data stream received by the WCD has a respective encoding and each encoding has a respective SINR threshold. The SINR threshold is based on the complexity of the respective encoding. More complex encodings enable higher data-transmission rates but require a higher SINR threshold. By requiring a higher SINR threshold, more complicated encodings are not as tolerant of noise and interference on the communication link between the WCD and the RAN.

In some embodiments, the WCD will receive each data stream with a respective antenna on the WCD. In other embodiments, an antenna may receive more than one data stream at a time. The antennas will convert the over-the-air radio signal that communicates the data streams into an electronic signal within the WCD. The antenna may couple the electrical signals to either a decoder or a memory (and in some embodiments both a decoder and a memory).

At block 504, a component within the WCD determines a SINR for each data stream. In some embodiments the SINR may be determined by the decoder component. However, other components within the WCD may determine the SINR as well. The SINR is a measurement of the ratio of the desired signal from the respective data stream to all interference and noise received by the respective antenna associated with the respective data stream. Interference and noise generally has two components, ambient radio noise and interference caused by undesired radio transmissions. The interference caused by undesired radio transmissions includes the data streams other than the respective data stream to decode. In some embodiments, block 504 may be omitted.

At block 506, the WCD decodes each data stream that has a SINR greater than or equal to the SINR threshold for the respective data stream. In some embodiments, at block 506 the WCD attempts to decode each data stream and does not take the SINR of the data stream into account when it attempts to decode. When the WCD decodes the data stream, it forms a corresponding decoded data stream. This decoded data stream can be output by the decoder of the WCD for further processing. The WCD may also store the decoded data in a memory for use later in the disclosed method.

At block 508, the WCD stores in a memory, as an un-decoded data stream, each data stream that has a SINR less than the SINR threshold for the respective data stream. The stored un-decoded data streams form a plurality of un-decoded data streams. In some embodiments (e.g., those where block 506 attempts to decode all data streams), block 508 more store in the memory all un-decodable data streams. The memory may be configured to store each data stream independently from each other data stream. Therefore, the WCD may be able to recover the un-decodable data stream at a later time.

At block 510, an encoder (or similar component) of the WCD re-encodes each decoded data stream based on the respective encoding of the corresponding data stream when it was transmitted from the RAN to the WCD. The re-encoding at block 510 forms a plurality of re-encoded data streams. Each re-encoded data stream is re-encoded based on the same encoding that the corresponding data stream was encoded with when the data stream was received by the WCD. Therefore, each re-encoded data stream is a version of the corresponding data stream, similar to the one that was received by the WCD, but without the noise component. Thus, each re-encoded data stream may be considered to be a clean version of the corresponding received data stream.

At block 512, the decoder of the WCD subtracts each of the plurality of re-encoded data streams from each of the plurality of un-decoded data streams stored in the memory, to form a plurality of adjusted un-decoded data streams. When the re-encoded data streams (e.g. clean data streams) are subtracted from the un-decoded data streams, it functions to remove a portion of the interference component of each un-decoded data stream. Thus, the subtraction function causes an increase in the SINR of each un-decoded data stream. In some instances, the increase in the SINR of each un-decoded data stream may be large enough for the SINR to exceed the SINR threshold. Therefore, the subtraction function may make a previously un-decodable data stream decodable.

At block 514, the decoder of the WCD decodes the plurality of adjusted un-decoded data streams. Because, in some instances, the increase in the SINR of each un-decoded data stream may be large enough for the SINR to exceed the SINR threshold, some data that was not decodable before the subtraction may now be decodable. The decoder will decode the data and provide an output of decoded data. The decoded data may also be stored to a memory.

In some instances, data may still be un-decodable after block 514. The WCD may repeat all or a portion of method 500 in an attempt to decode the still un-decodable data. For example, in some embodiments the RAN may transmit data streams with three different encodings. At first, the WCD may be able to only decode data encoded with the first encoding. The WCD will re-encode the data encoded with the first encoding and subtract it from the data received with the second and third encoding. After the subtraction, the WCD may be able to decode data encoded with the second encoding. The WCD will re-encode the data encoded with the second encoding and subtract it from the data received with the second and third encoding. After the data encoded with the first encoding and the data encoded with the second encoding are subtracted from the data encoded with the third encoding, the data encoded with the third encoding may be decoded. Thus, method 500 may be performed in an iterative way, based on the encodings of the various data streams.

In further embodiments, the WCD may send a communication to the RAN if any data streams cannot be decoded (either before or after the subtraction process was performed). The RAN may responsively adjust the encoding associated with the un-decodable data stream to have a lower SINR threshold. Therefore, the RAN may adapt the encoding (and thus data rate) based on not being able to decode at least one data stream. However, in some instances, by subtracting a data stream based on decoded data, the WCD may be able to recover previously un-decodable data.

6. Conclusion

Various exemplary embodiments have been described above. Those skilled in the art will understand, however, that changes and modifications may be made to these embodiments without departing from the scope of the claims.

We claim:

1. A method carried out by a wireless communication device (WCD), comprising:
   receiving a first communication signal from a wireless base station (BS), wherein the first communication signal comprises at least two data streams, wherein each data stream has a respective encoding and each encoding has a respective signal-to-interference-plus-noise ratio (SINR) threshold;
   decoding each data stream that has a SINR greater than or equal to the SINR threshold for the respective data stream, to form a corresponding decoded data stream;
   storing in a memory, as an un-decoded data stream, each data stream that has a SINR less than the SINR threshold for the respective data stream, wherein the storing forms a plurality of un-decoded data streams;
   re-encoding each corresponding decoded data stream based on the respective encoding of the corresponding data stream, wherein the re-encoding forms a plurality of re-encoded data streams;
   subtracting each of the plurality of re-encoded data streams from each of the plurality of un-decoded data streams stored in the memory, to form a plurality of adjusted un-decoded data streams; and
   decoding the plurality of adjusted un-decoded data streams.

2. The method of claim 1, further comprising:
   determining a SINR for each data stream;
   determining an adjusted SINR for each of the plurality of adjusted un-decoded data streams; and
   decoding each adjusted un-decoded data stream that has an adjusted SINR greater than or equal to the SINR threshold for the respective data stream.

3. The method of claim 2, further comprising the WCD communicating an indicator to the BS in response to determining that at least one adjusted un-decoded data stream has an adjusted SINR less than the SINR threshold for the respective data stream.

4. The method of claim 3, wherein the indicator provides an indication of the adjusted SINR.

5. The method of claim 1, wherein each encoding has a respective data rate.

6. The method of claim 1, wherein the WCD has multiple antennas and each data stream of the first communication signal is received by a different antenna.

7. The method of claim 1, further comprising the WCD communicating an indicator to the BS in response to determining that the SINR for each data stream is greater than or equal to the SINR threshold for the respective data stream.

8. An article of manufacture including a non-transitory computer-readable medium having stored thereon program instructions that, if executed by a processor in a radio system, cause the radio system to perform operations comprising:
   receiving a first communication signal from a wireless base station (BS), wherein the first communication signal comprises at least two data streams, wherein each data stream has a respective encoding and each encoding has a respective signal-to-interference-plus-noise ratio (SINR) threshold;
   decoding each data stream that has a SINR greater than or equal to the SINR threshold for the respective data stream, to form a corresponding decoded data stream;
   storing in a memory, as an un-decoded data stream, each data stream that has a SINR less than the SINR threshold for the respective data stream, wherein the storing forms a plurality of un-decoded data streams;
   re-encoding each corresponding decoded data stream based on the respective encoding of the corresponding data stream, wherein the re-encoding forms a plurality of re-encoded data streams;
   subtracting each of the plurality of re-encoded data streams from each of the plurality of un-decoded data streams stored in the memory, to form a plurality of adjusted un-decoded data streams; and
   decoding the plurality of adjusted un-decoded data streams.

9. The article of manufacture of claim 8, further comprising:
   determining a SINR for each data stream;
   determining an adjusted SINR for each of the plurality of adjusted un-decoded data streams; and
   decoding each adjusted un-decoded data stream that has an adjusted SINR greater than or equal to the SINR threshold for the respective data stream.

10. The article of manufacture of claim 9, further comprising communicating an indicator to the BS in response to determining that at least one adjusted un-decoded data stream has an adjusted SINR less than the SINR threshold for the respective data stream.

11. The article of manufacture of claim 10, wherein the indicator provides an indication of the adjusted SINR.

12. The article of manufacture of claim 9, wherein each encoding has a respective data rate.

13. The article of manufacture of claim 9, wherein each data stream of the first communication signal is received by a different antenna.

14. The article of manufacture of claim 9, further comprising communicating an indicator to the BS in response to determining that the SINR for each data stream is greater than or equal to the SINR threshold for the respective data stream.

15. A method carried out by a wireless communication device (WCD), comprising:
   receiving a first communication signal from a wireless base station (BS), wherein the first communication signal comprises a plurality of data streams, wherein each data stream has a respective encoding;
   determining a signal-to-interference-plus-noise ratio (SINR) threshold for each data stream, wherein the SINR threshold is based on the encoding of each respective data stream;
   decoding a data stream of each of the data streams that has the lowest SINR threshold, to form a corresponding decoded data stream;
   storing in a memory, as an un-decoded data stream, each data stream other than the data stream that has the lowest SINR threshold, wherein the storing forms a plurality of un-decoded data streams;
   re-encoding the decoded data stream based on the respective encoding of the corresponding data stream, wherein the re-encoding forms a re-encoded data stream;
   subtracting the re-encoded data stream from each of the plurality of un-decoded data streams stored in the memory, to form a plurality of adjusted un-decoded data streams;
   the WCD iteratively:
      decoding each adjusted un-decoded data stream that has the lowest SINR threshold from the plurality of un-decoded data streams,
      re-encoding and storing the decoded data stream based on the respective encoding of the corresponding data stream, wherein the re-encoding forms an updated re-encoded data stream,
      removing the adjusted un-decoded data stream from the memory, and
      subtracting the updated re-encoded data stream from each of the plurality of un-decoded data streams stored in the memory, to form the plurality of adjusted un-decoded data streams.

16. The method of claim 15, further comprising if a data stream cannot be decoded, the WCD communicating an alert indicator to the base station.

17. The method of claim 16, wherein the indicator provides an indication of the SINR threshold associated with the data stream that cannot be decoded.

18. The method of claim 15, wherein each encoding has a respective data rate.

19. The method of claim 15, wherein the WCD has multiple antennas and each data stream of the first communication signal is received by a different antenna.

20. The method of claim 15, further comprising the WCD communicating an indicator to the BS in response to determining that the SINR for each data stream is greater than or equal to the SINR threshold for the respective data stream.

* * * * *